United States Patent [19]

Londner épouse Ours

[11] 4,266,314
[45] May 12, 1981

[54] METHOD OF MANUFACTURE OF SPORTS SHOES, AND SHOES MANUFACTURED BY SAID METHOD

[76] Inventor: Rosette Londner épouse Ours, 62, Avenue Clarisse, F-92420 Vaucresson, France

[21] Appl. No.: 73,543

[22] Filed: Sep. 7, 1979

[51] Int. Cl.³ .................. A43D 9/00; A43C 13/08
[52] U.S. Cl. .................. 12/142 P; 12/142 RS; 36/14
[58] Field of Search ........ 12/142 R, 142 E, 142 MC, 12/142 RS, 142 P; 36/83, 128, 11, 14

[56] References Cited

U.S. PATENT DOCUMENTS

| | | | |
|---|---|---|---|
| 1,622,860 | 3/1927 | Cutler | 36/14 |
| 2,412,042 | 12/1946 | Gottschalk | 12/142 E |
| 2,586,045 | 2/1952 | Hoza | 36/14 |
| 2,617,208 | 11/1952 | Marx et al. | 36/7.3 |
| 3,298,034 | 1/1967 | Szegvari | 36/7.3 |

*Primary Examiner*—Patrick D. Lawson
*Attorney, Agent, or Firm*—Michael J. Striker

[57] ABSTRACT

At least two overlapping portions of plastic material are overmolded successively on a lining formed by a slipper so as to cover the slipper sole and upper at least to a partial extent. The method involves the following successive operations:

overmolding of a plastic layer which covers the entire upper of the slipper;

overmolding of a plastic stiffening reinforcement having greater rigidity than the previous layer and constituting a shell around the rear counter as well as a thin intermediate sole;

addition of an outer wearing sole of molded plastic material.

4 Claims, 10 Drawing Figures

METHOD OF MANUFACTURE OF SPORTS SHOES, AND SHOES MANUFACTURED BY SAID METHOD

This invention relates to the manufacture of sports shoes such as football boots.

In the case of football boots, these latter constitute the main item of equipment of football players, particularly as they touch the ball only with their boots. In point of fact, the boots are subjected to high stresses which are exerted under any weather conditions and especially rain, snow or mud and so forth. Moreover, few football players take care of their boots. In fact, players generally consider it sufficient to wash them with running water, then put them away in their sports bags.

Under these conditions, manufacturers have sought to produce football boots of sufficiently high strength to withstand the stresses and bad treatment to which they are subjected. Thus boot manufacturers have found it necessary to replace the old type of leather soles by one-piece molded soles of rubber or plastic. This makes it possible to provide soles of much higher strength than the old type of leather sole. However, since the uppers of boots manufactured in this manner continue to be made of leather, this method of manufacture does not completely solve the problem set forth in the foregoing.

It has also been proposed to manufacture some types of sports shoes by starting from a slipper of leather or any other suitable material which is subsequently intended to serve as a lining and on which one or a number of covering layers of plastic material are overmolded. A solution of this type is adopted in order to obtain perfect water-tightness, especially at the point of junction between the sole and the upper of the shoe. It is in any case for this reason that the overmolded covering layer or layers of plastic material completely surround the junction zone between sole and upper in this case.

Again in this instance, however, a solution of this type is not likely to prove satisfactory in the case of football boots. Boots of this type must in fact be capable of affording high resistance to the stresses mentioned earlier.

Moreover, it is essential to ensure that a boot of this type is not liable to undergo any deformation at the time of kicking of the ball since this would impair the accuracy of the kick.

It should be noted in this connection that one of the portions of the football boot upper which performs an important function is the rear stiffening or counter of a boot. The counter in fact constitutes a virtual boot frame and also has the function of securing the wearer's heel within this latter in order to prevent any possibility of lifting or lateral inclination. The boot counter therefore plays a decisive part and in order to prevent any risk of accidental deformation of a football boot, the rear counter must be intimately joined to the sole of the boot in order to prevent any possibility of "buckling", thereby ensuring accuracy of a kick or shot at a goal.

The present invention is therefore directed to a novel method of manufacture which is intended to achieve this objective.

Said method is of the type in which the boot is fabricated from a slipper of leather or other suitable material designed to form a lining, and consists in carrying out on said lining the successive overmolding of at least two overlapping portions of plastic material which cover the sole of said slipper and the upper of this latter at least to a partial extent. However, said method is distinguished by the fact that the following operations are carried out in sequence:

- overmolding of a layer of plastic material which covers the entire upper of the slipper;
- overmolding on said assembly of a stiffening reinforcement of plastic material having greater rigidity than the previous layer and constituting only a shell which surrounds the rear counter of the upper as well as a thin intermediate sole;
- the addition of an outer wearing sole of molded plastic material which may have been manufactured separately or which can be molded at the same time as the stiffening reinforcement but formed of less rigid material if necessary.

In a particular form of execution of said method, the outer wearing sole is molded at the same time as the stiffening reinforcement constituted by the shell of the counter and the thin sole.

The present invention is also concerned with sports shoes such as football boots which are manufactured by carrying out the method hereinabove defined. Said boots or shoes are provided with a lining of leather or other suitable material on which are overmolded two overlapping portions of plastic materials of different types and are distinguished by the fact that the first layer of plastic material overmolded in direct contact with the lining covers the entire upper of this latter whilst the second overmolded portion constitutes a stiffening reinforcement which is formed of plastic material having greater rigidity than in the case of the first layer and which comprises solely a shell for surrounding the rear counter of the upper, as well as a thin intermediate sole, an outer wearing sole being added to this latter.

However, further distinctive features and advantages of the invention will become apparent from the following description, reference being made to the accompanying drawings which are given solely by way of indication and in which.

The method according to the invention consists of the manufacture of a sports shoe and more particularly a football boot by means of a starting element constituted by a kind of slipper 1 of leather or any other suitable material. The upper of said slipper is formed by two pieces 2 of leather or other suitable material which are simply assembled at the front and the rear along two zigzag seam lines 3 and 4. Said upper is attached "edge-to-edge" to a first sole 5 by means of seams 6 of the "Strobel" type.

Figure 1:
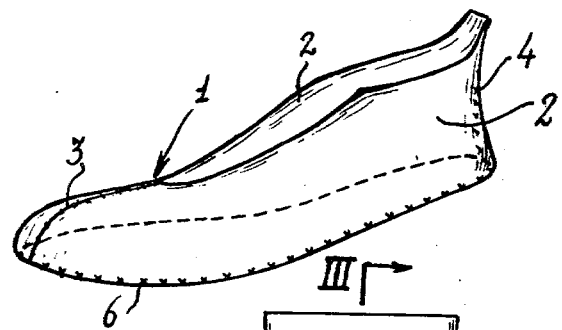
FIG. 1 is a perspective view of the slipper employed as a starting element for the application of the method in accordance with the invention.
Figure 2:
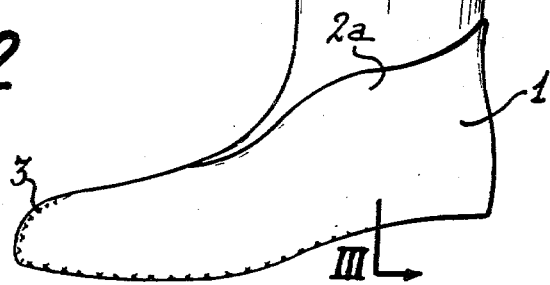
FIG. 2 illustrates said slipper after placing on a last and prior to arrangement of the assembly within a first overmolding mold.
Figure 4:
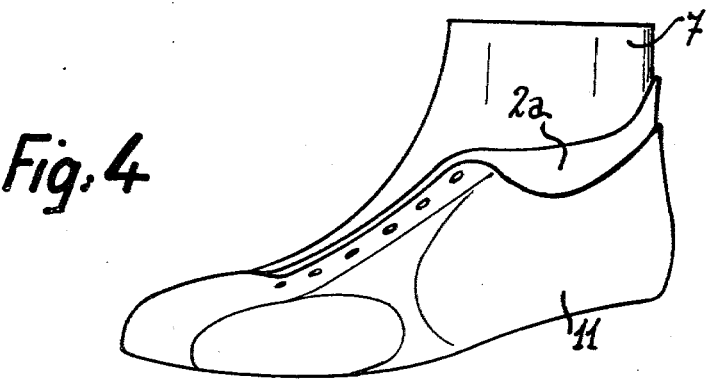
FIG. 4 is a perspective view which is similar to FIG. 2 but shows the starting element after overmolding of a first layer of plastic material used for covering the entire upper of the slipper which serves as a lining.

The slipper 1 as thus formed is shaped on a last 7 as shown in FIG. 2. After the outer face of said slipper has been glued in position, the assembly is placed within a mold 8 provided with a cavity 9 adapted to receive the lower portion of the last 7 and the slipper 1 which is placed over this latter.

Figure 3:
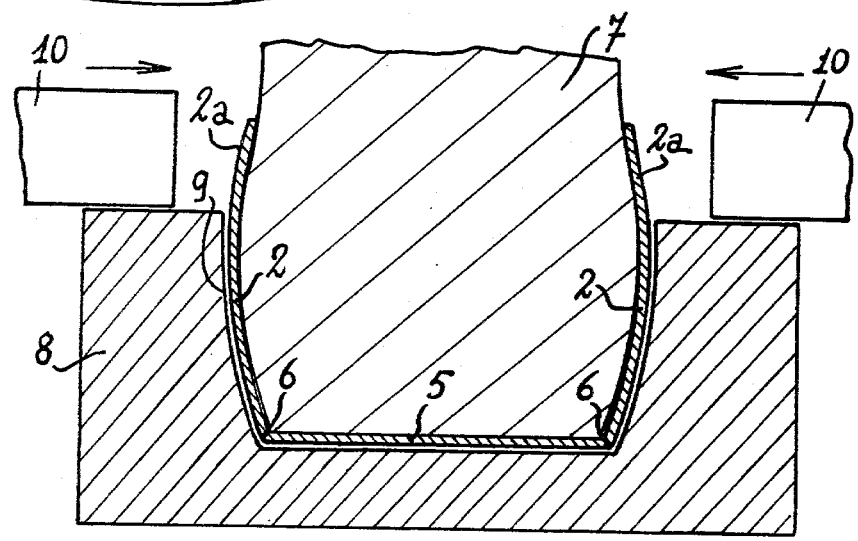
FIG. 3 is a sectional view of the first mold employed, this view being taken along line III—III of FIG. 2.

As is apparent from FIG. 3, said cavity 9 provides a gap around the slipper 1. Said gap is in turn intended to serve as a mold cavity for the overmolding of an outer skin 11 of synthetic resin which entirely covers the upper of the slipper 1 as well as the sole 5 of this latter, said sole being covered by a portion 11a of said overmolded skin.

The pieces 2 which constitute the upper of the slipper project above the cavity 9 of the mold 8 in the form of portions 2a which are intended to be subsequently removed. In point of fact, the mold is provided with two movable punches 10 which are intended to be applied against said portions in order to close the mold cavity 9 prior to injection of the plastic material.

After completion of the molding operation, the portions 10a of the upper of the slipper project above the outer skin 11 of synthetic resin. However, said portions 10a are intended to be subsequently removed by cutting along the top edge of the outer skin 11.

Said skin constitutes the element which endows the upper of the corresponding shoe or boot with its full degree of strength. However, in spite of the presence of this outer skin of synthetic resin, the upper of the corresponding boot is not subject to the usual disadvantages of uppers formed solely of plastic material. In fact, the presence of an inner slipper 1 of leather makes it possible for the boot to "breathe". Moreover, the upper of the boot retains a sufficient degree of flexibility to conform to the shape of the user's foot.

As can readily be understood, it is possible to provide any raised portion or any desired pattern on the outer skin 11 of plastic material, especially ribs or strengthening zones of greater thickness.

Figure 5:
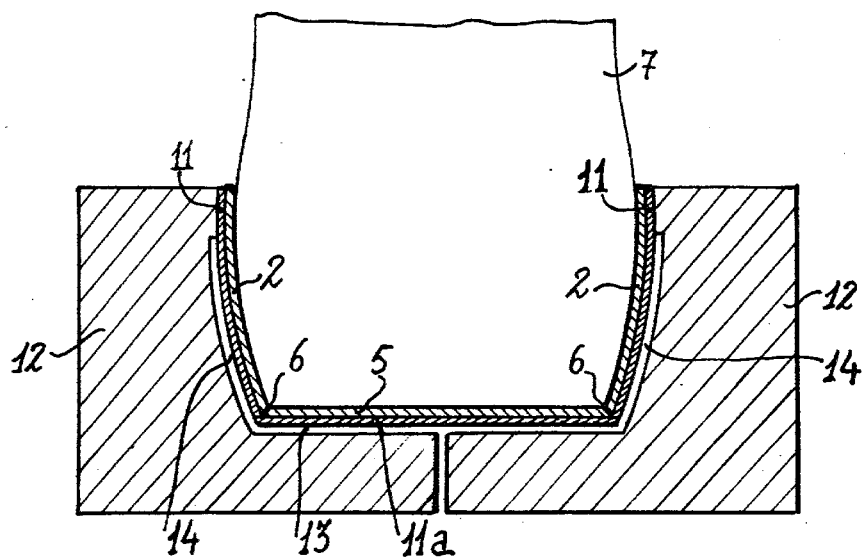
FIG. 5 is a sectional view of the second mold employed for overmolding a reinforcement constituted by a shell which surrounds the counter and a thin intermediate sole, this view being intended to correspond to a section along line III—III of FIG. 2.
Figure 6:
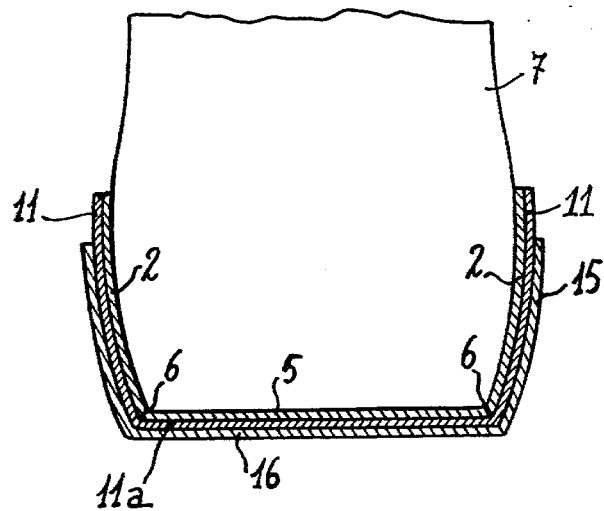
FIG. 6 is a sectional view along the same plane but after removal of the assembly from the last mold employed.
Figure 7:
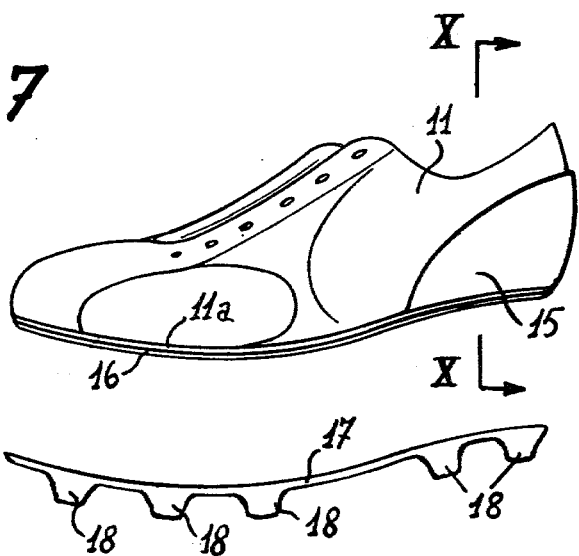
FIG. 7 is a perspective view of the shoe thus obtained prior to positioning of the outer wearing sole of this latter.
Figure 8:
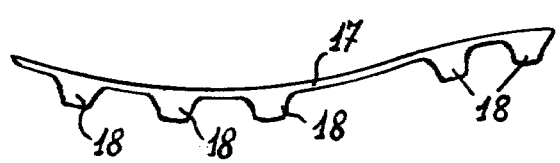
FIGS. 8 and 9 are views in elevation of two different embodiments of the outer wearing sole which is added above said shoe.
Figure 9:
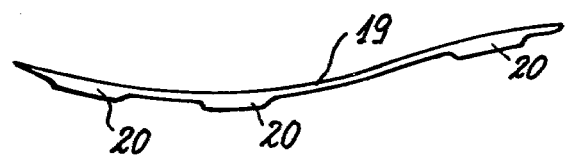
Figure 10:
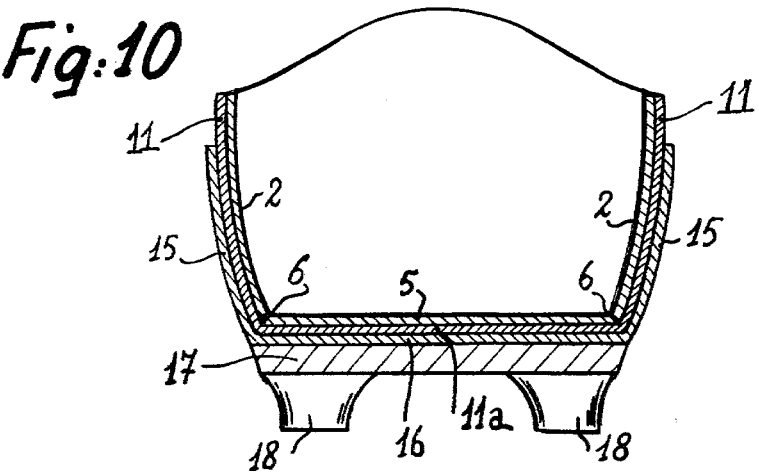
FIG. 10 is a sectional view taken along line X—X of FIG. 7 after positioning of one of said two outer soles.

Without being removed from the last 7, the assembly thus obtained is then placed within the second mold shown in FIG. 5. Said mold comprises two complementary half-shells 12 which are intended to open by relative withdrawal in opposite directions. Said half-shells form a gap 13 which extends beneath the sole 5 of the inner slipper 1 and over the entire surface of said sole.

Moreover, said half-shells are closely applied against the external surface of the outer skin 11 of plastic material except in the region opposite to the rear counter. In this region, the two half-shells 12 in fact form a gap 14 which surrounds the rear counter and communicates with the gap 13 mentioned above.

Under these conditions, when plastic material is injected into said mold, there is formed on the assembly hereinabove described an outer reinforcement constituted by the combination of a shell 15 which completely surrounds the rear counter and by a thin sole 16 which covers the sole 5 of the inner slipper 1. In fact, the shell 15 is formed by the cavity 14 of the mold 12 whilst the thin sole 16 is formed by the gap 13 of said mold.

This overmolding operation is performed in practice by employing a plastic material of greater rigidity than in the previous case. It is in fact necessary to obtain a rear shell 15 which is sufficiently rigid to endow the corresponding portion of the boot with a very high degree of rigidity. It is also advisable to obtain a thin sole 16 which is made integral with said shell and is of substantial rigidity. To this end, it is possible to employ rubber having a suitable composition or a synthetic material such as vinyl chloride or polyurethane.

It is then possible to fix in position the normal outer sole of the boot which can be of various types in accordance with requirements. Thus a conventional sole 17 having studs 18 can be employed or a sole 19 provided with external ribs 20. Fixing of said outer sole in position can be carried out at a subsequent stage of manufacture.

However, it is also possible to carry out this fixing operation at the same time as overmolding of the outer reinforcement constituted by the shell 15 and the thin intermediate sole 16. In such a case, it is preferable to employ a mold provided opposite to the gap 13 of the mold 12 with a cavity for receiving an outer sole 17 or 19 prior to positioning of the shell 15.

It is then only necessary to provide suitable raised portions on the external surface of said sole in order to ensure that this latter is securely attached to the thin intermediate sole 16 at the time of molding of this latter.

In another embodiment of the method according to the invention, it is possible to carry out simultaneously in the same mold on the one hand the molding of the outer sole 17 or 19 and on the other hand the molding of the reinforcement constituted by the shell 15 of the counter and by the thin intermediate sole 16. This can be achieved by making use of two plastic materials having different characteristics for molding these two portions. This mode of operation has the advantage of reducing times of manufacture since the outer sole 17 or 19 is molded at the same time as the outer reinforcement and since said outer sole is thus securely fixed to said assembly without any additional operation.

Irrespective of the particular mode of application of the method under consideration, this latter makes it possible to obtain on the boot a rigid, high-strength counter which forms one piece with a thin intermediate sole 16 extending along the entire length of this latter. Under these conditions, said counter constitutes a wholly effective support structure for the boot since it is made integral with the thin sole 16. Said support structure thus endows the boot with a very high degree of rigidity while avoiding any risk of deformation of this latter. Moreover, the existence of said rigid structure has an advantage in that the least change of inclination or orientation of the wearer's foot is transmitted to the entire boot. This accordingly ensures very high precision of kicking or shots at goals performed by football players.

A further advantage lies in the fact that the rear portion of the boot is consequently endowed with outstanding strength and water-tightness. This rear portion is therefore not liable to be damaged by moisture or exposure to bad weather conditions. Thus the counter of the boot under consideration remains effective throughout the lifetime of this latter, with the result that said counter is perfectly capable of performing its intended function, namely that of serving as a support structure for the boot and of ensuring that the user's heel is perfectly held in position.

As mentioned in the foregoing, the invention also has for its object the boots and shoes which are manufactured by application of this method.

It should be noted in this connection that the method can be employed not only for the manufacture of football boots but also for the production of sports shoes of different types.

What is claimed is:

1. A method of manufacture of a sports shoe, such as a football boot, comprising the steps of forming a lining fabricated from a slipper of leather or other suitable material having an upper and a sole; overmolding of a first layer of plastic material to cover the entire upper and the sole of said slipper to obtain an assembly; overmolding on said assembly of a second layer of a stiffening reinforcement of plastic material having greater rigidity than that of said first layer, said second layer overlapping said first layer and constituting only a shell which surrounds the rear counter of the upper and a thin intermediate sole which covers the sole of the slipper; and applying and fixing an outer wearing sole of molded plastic material to the outer surface of said thin intermediate sole.

2. The method of manufacture according to claim 1, wherein said outer wearing sole is molded at the same time as said second layer of stiffening reinforcement.

3. The method of manufacture according to claim 1, wherein said outer wearing sole is prefabricated separately and thereafter fixed to said thin intermediate sole.

4. A sports shoe, such as a football boot, comprising a lining of leather or other suitable material including an upper and a sole; a first layer of plastic material overmolded in direct contact with said lining and covering the entire upper and the sole of said lining, a second overmolded layer overlapping said first layer and having a stiffening reinforcement, said second layer being formed of plastic material having greater rigidity than that of said first layer and forming solely a shell for surrounding the rear counter of the upper and a thin intermediate sole which covers the sole of the lining, and an outer wearing sole affixed to said intermediate sole.

* * * * *